United States Patent [19]

Ely

[11] 4,358,238

[45] Nov. 9, 1982

[54] COLLECTION, STORAGE AND DISPOSAL SYSTEM FOR REFUSE, TRASH OR ANY OTHER APPLICABLE MATERIALS

[75] Inventor: Lewis C. Ely, Atlanta, Ga.

[73] Assignee: Ron Freeman, Atlanta, Ga. ; a part interest

[21] Appl. No.: 46,304

[22] Filed: Jun. 7, 1979

[51] Int. Cl.[3] .......... B66F 3/00; B60F 1/56

[52] U.S. Cl. .......... 414/387; 100/229 A; 105/241.2; 105/310; 105/364; 188/69; 220/335; 280/408; 280/411 R; 280/515; 298/35 R; 414/573

[58] Field of Search .......... 414/344, 373, 376, 387, 414/388, 400, 572, 573; 298/35 R; 220/264, 335; 105/241 C, 280, 308 R, 308 B, 310, 364; 280/408, 410, 411 R, 411 C, 763, 43.24; 222/502; 100/229 A

[56] References Cited

U.S. PATENT DOCUMENTS

| | | | |
|---|---|---|---|
| 1,366,665 | 4/1920 | Underhill et al. | 280/408 |
| 1,721,308 | 7/1929 | Lormor | 220/264 |
| 1,840,423 | 1/1932 | Wine | 105/280 |
| 2,572,348 | 10/1951 | Johnson | 280/43.24 |
| 2,988,175 | 6/1961 | West | 188/69 X |
| 3,059,789 | 10/1962 | Bowles | 414/400 X |
| 3,542,396 | 11/1970 | Hill | 280/411 R |

FOREIGN PATENT DOCUMENTS

| | | | |
|---|---|---|---|
| 1003696 | 1/1977 | Canada | 105/241 C |

*Primary Examiner*—Robert G. Sheridan

*Attorney, Agent, or Firm*—Newton, Hopkins & Ormsby

[57] ABSTRACT

A train of tandem arranged, wheeled, refuse receptacles, pulled by a prime mover along a path, are successively moved over a dump chute to drop their contents when their discharge doors are successively tripped, the contents falling downwardly through the chute and into the entrance opening of an underground compactor. The reciprocating ram of the compactor passes the contents sidewise into the awaiting container of a refuse collection vehicle, compacting the contents therein.

17 Claims, 7 Drawing Figures

COLLECTION, STORAGE AND DISPOSAL SYSTEM FOR REFUSE, TRASH OR ANY OTHER APPLICABLE MATERIALS

BACKGROUND OF THE INVENTION

1. Field of the Invention

This invention relates to a collection, storage and disposal system for refuse, trash or any other applicable material and is more particularly concerned with an apparatus and process for accumulating refuse.

2. Description of the Prior Art

In the past, the collection of refuse in high population areas has been an expensive problem. For example, it is common practice, at the present time, to dispose trash containers at strategic locations around an apartment complex and employ a front end loader, known as a "DUMPSTER", to pick up each container, invert it over the hopper of the loader and then return it to its original location. The loaders are especially built and are quite expensive. The containers are heavy and immobile and must be located where the loader will have access to the container.

Mobile containers arranged in tandem for transporting various goods have been devised and, more than one year ago, an apartment complex in Atlanta installed and began using wheeled receptacles designed to be towed in tandem to a site. In operation, however, only a single receptacle is towed at a time and its contents released to a refuse accumulation pit. Also, the receptacle had a single drop door supported in its closed position by a spring loaded cross bar which was automatically tripped by a camming bar. The pit was provided with a compactor which fed to a container.

A search of the prior art revealed the following U.S. Pat. Nos. 1,213,327; 3,790,008; 3,872,796; 3,994,238; 4,051,960.

All of the above patents disclose wheeled containers towed in tandem with bottom discharge doors tripped by mechanisms to successively release their contents into a pit.

The prior art devices are not well suited to serve the refuse disposal needs of an apartment complexes and are quite complicated and expensive.

The device of the present invention will handle the same volume of refuse as the front end loader system with only about one-fifth the fuel consumption, which the front end load system employs. In other words, when the prior art front end loader picks up a container, the container must be lifted and inverted; then the compactor in the front end loader must be actuated. This requires substantial amount of fuel as compared to my system in which the receptacles are towed to a dump zone and the refuse dropped into a compactor which compacts the released refuse into the large container, which is then loaded onto the chassis of a truck and transported to a disposal site.

In handling the same volume, the front end loader system would require about seventy-five hydraulic cycles whereas the present system requires only two hydraulic cycles. The comparative maintenance of the two systems is also of comparable ratio, i.e. about 75:2.

SUMMARY OF THE INVENTION

Briefly described, the present invention includes a plurality of substantially identical refuse receptacles which are readily arranged in a train pulled by a prime mover. Each receptacle includes a rectangular metal container provided at its top with a spring loaded hinged top lid. A pair of opposed wheels on opposite sides of the container, support the receptacle. A towing tongue and retractable front wheel are at the front of each receptacle and a clevis at the back. A pair of opposed discharge doors are hinged to the lower side edges of the container and are normally latched in a closed condition by front and rear detents. Pivotally carried cross-bars, when moved by camming elements, trips the detents to release the doors when the receptacle is disposed in the dumping zone.

Within a pit are converging, upwardly inclined, camming bars which return the doors to a closed condition as the receptacle is wheeled from the dumping zone.

A compactor, disposed at the bottom of the pit, receives the refuse from each successive receptacle and the ram thereof intermittently moves the contents of the compactor sidewise into the open end of a hopper of a refuse collection vehicle.

Accordingly, it is an object of the present invention to provide a refuse collection and storage system which is inexpensive to manufacture, durable in structure and efficient in operation.

Another object of the present invention is to provide a refuse disposal system which is particularly suited for use in apartment complexes and which enable the individual receptacles to be located in a variety of refuse collection sites.

Another object of the present invention is to provide a refuse collection system which will permit the accumulation of liquid as well as solid waste.

Another object of the present invention is to provide a refuse collection system which will reduce to a minimum the cost of collecting and disposing of refuse.

Other objects, features and advantages of the present invention will become apparent from the following description when taken in conjunction with the accompanying drawings wherein like characters of reference designate corresponding parts throughout the several views and wherein.

DETAILED DESCRIPTION OF THE PREFERRED EMBODIMENT

Figure 1:
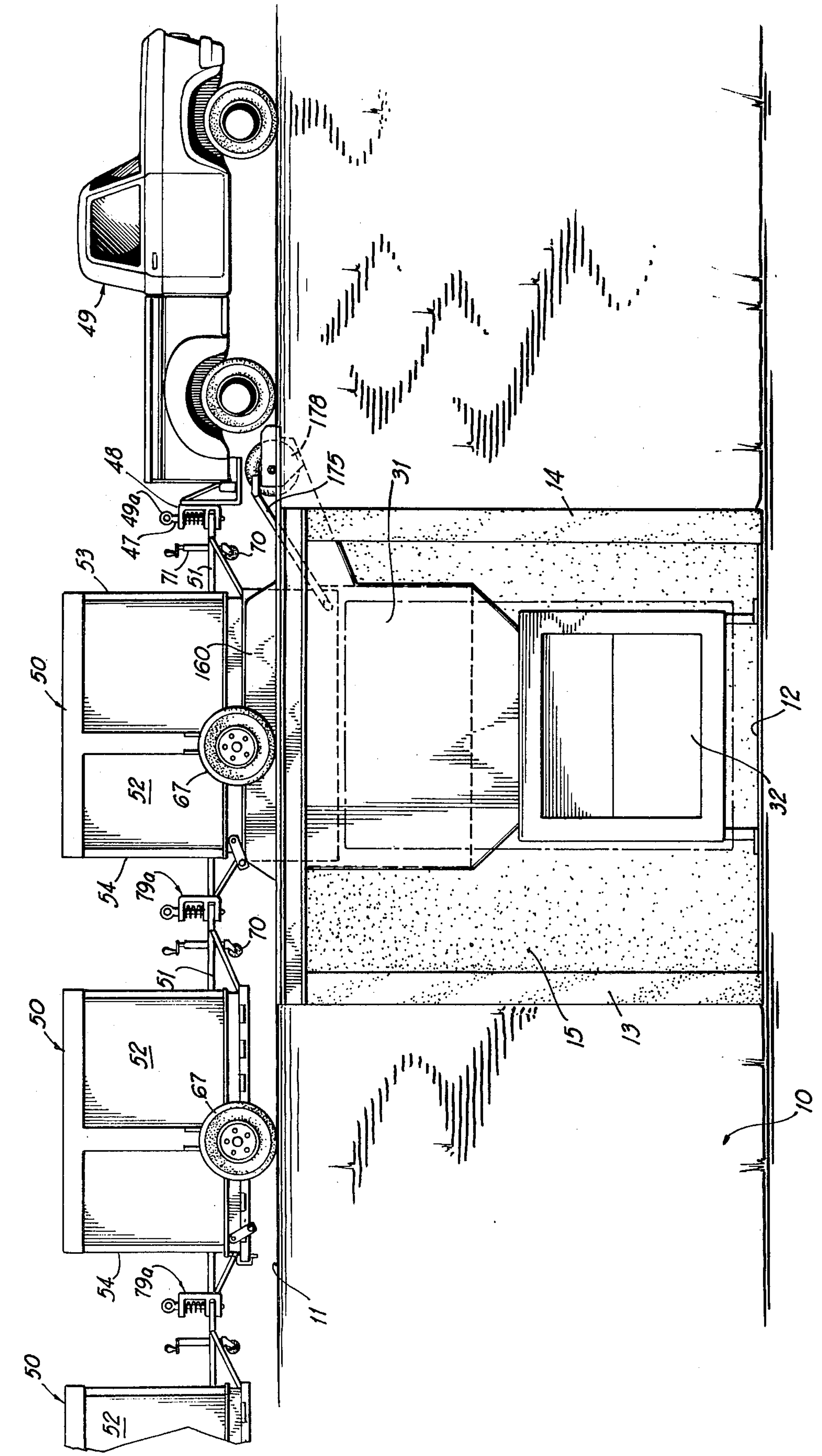
FIG. 1 is a side elevational view of a refuse disposal pit having installed therein a refuse collection and disposal system constructed in accordance with the present invention.

Referring now in detail to the embodiment chosen for the purpose of illustrating the present invention, numeral 10, in FIG. 1, denotes the ground which has been prepared through excavation and landscaping to provide a sidewise open pit. The upper terraced portion of ground 10 defines a top longitudinal receptacle dumping pathway or roadway 11 and the bottom portion of ground is provided with a lower laterally extending hopper receiving pad 12. A pair of spaced, opposed, parallel, upright or vertical concrete walls 13 and 14 joined at their inner end by a back concrete wall 15, define a vertical pit within ground 10 which is open at its top and front, as seen in FIG. 1.

Figure 2:
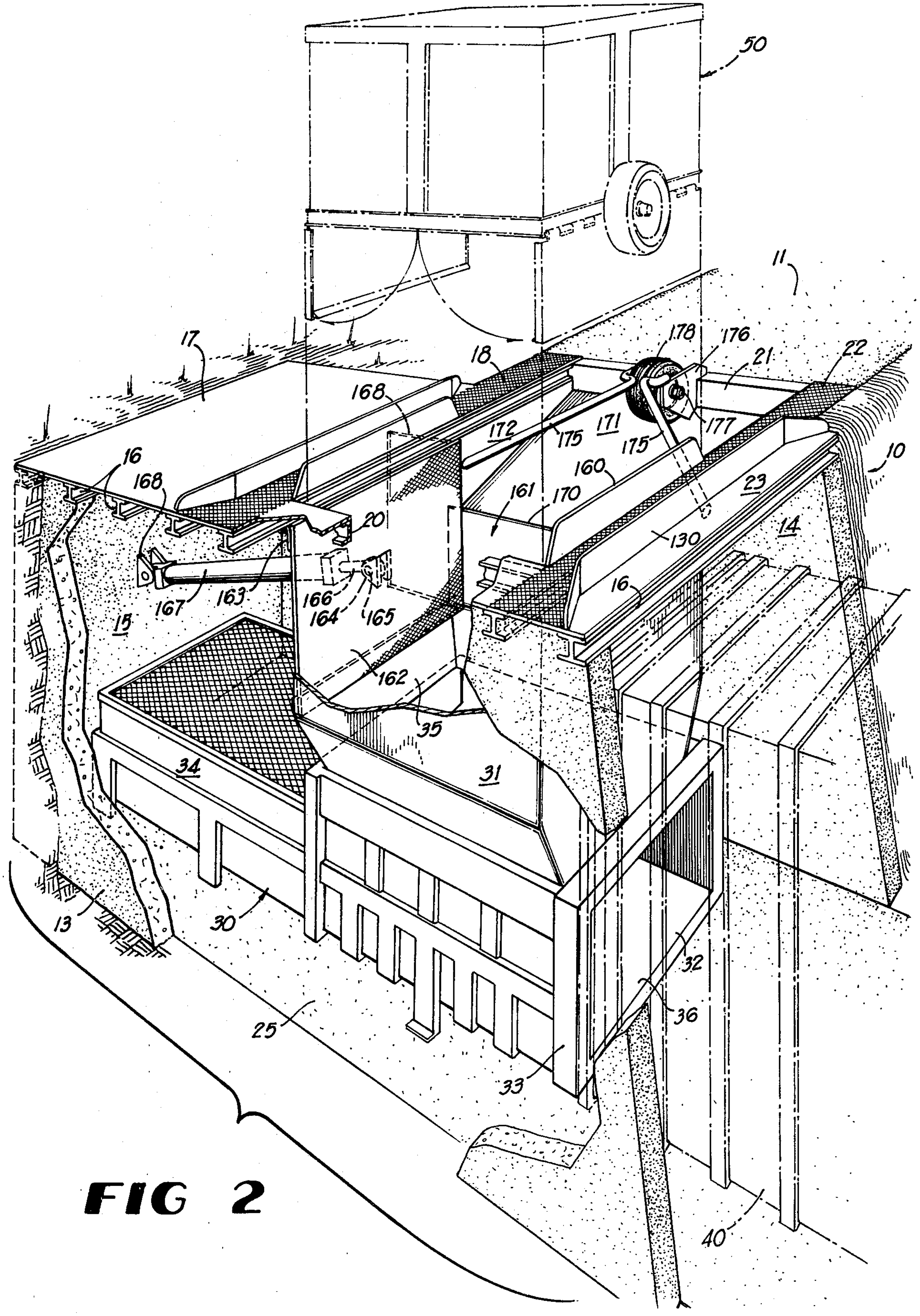
FIG. 2 is a partially broken away perspective view showing the refuse disposal chute and the compactor of the system depicted in FIG. 1, a refuse collection receptacle thereof being shown in an exploded position in broken lines.

As best seen in FIG. 2, I beams 16, which are disposed in spaced, parallel longitudinal relationship extend between the upper edges of the opposed side walls 13 and 14. The beams 16 support a flat horizontal roof structure in a plane with roadway 11. This roof structure covers the three walls 13, 14 and 15 and includes a flat metal cover plate 17 which extends from wall 15, forwardly. The plate 17 abutts a rectangular elongated wheel receiving plate 18 which is disposed in a common plane with the plate 17.

Extending across between two central beams 16 outwardly of plate 18, are a pair of spaced cross bars or transverse struts 20 and 21, the cross bars 20 supporting an entrance end plate 21 which is disposed in a common plane with the plates 17 and 18. In transversely spaced parallel relationship to the wheel receiving plate 18 is a second wheel receiving plate 22, the end plate 21 connecting the inner rear edge portions of the plates 18 and 22, adjacent the entrance end for the receptacles 50. Outwardly of the wheel receiving plate 22 is a front plate 23. The plates 17, 18, 21, 22 and 23 are in a common horizontal plane extending over the I beams 16 and over the upper end of the pit. The front plate 23 terminates at the side edge pit.

At the bottom of the pit is a flat concrete floor 25 which is parallel to the plates 17 through 23. The floor 25 forms the bottom of the pit and extends laterally, as seen in FIG. 2, to join the pad 12.

Disposed within the cavity or pit defined by the walls 13, 14 and 15 and on the floor 25 is a compactor, denoted generally by the numeral 30. In the present embodiment, the compactor is a model QP 2, QP 3 or QP 4 compactor produced by Quality Purvis of 2982 Jefferson Road, Hopkins, Mich. 49328. Such a compactor 30 has an open top which receives an upstanding, vertically disposed, tubular chute 31.

The compactor 30 at a lateral side includes a discharge mouth 32, defined by a rectangular frame 33. The compactor 30 contains a reciprocating ram (not shown) in a ram housing 34. The ram includes a vertically disposed, laterally movable, ram plate 35 which is opposite to the mouth. When the ram is retracted, plate 35 is disposed in the position shown in FIG. 2, on one side of the floor 36 of the compactor. When the ram is actuated, the ram plate 35 will move across the upper opening of the compactor 30 and the floor 36 so as to force the accumulated refuse on the floor 36 sidewise out of the mouth 32 of the compactor 30. Since the compactor 30 is conventional, a more detailed description thereof is not deemed necessary.

According to the present invention, the hopper 40, seen in broken lines in FIG. 2, is disposed adjacent to the discharge mouth 32 of the compactor 30. This hopper 40 is relatively large, fitting between the front edges of walls 13 and 14 and has an opening which aligns with the opening or mouth 32 so as to receive therein the material which is discharged sidewise from the compactor 30.

The ram plate 35 of the compactor 30 is reciprocated from time-to-time so as to urge the refuse into the container 40 and to eventually compact it therein into a very dense condition. When the container 40 is filled, a vehicle such as a roll on-off vehicle (not shown) removes the container 40 from its position and the door (not shown) to the container 40 is closed to confine the contents therein. A new container 40 is then installed for again receiving the refuse and the old container 40 is transported to a refuse dump for discharge of its contents.

For receiving refuse at a plurality of locations, such as from individual apartment buildings, individual receptacles, denoted generally, by the numeral 50, are provided. These receptacles 50 are each capable of being arranged in tandem, as illustrated in FIG. 1 and of being drawn in a train or in tandem by a prime mover, such as a conventional half ton truck, denoted generally by the numeral 49. This half ton truck 49 is provided with a trailer hitch assembly **49*a* including clevis 48, having a spring loaded, vertically movable latching bar 47 which can be retracted upwardly to open the clevis to receive the tongue 51 of the receptacle 50**.

Figure 3:
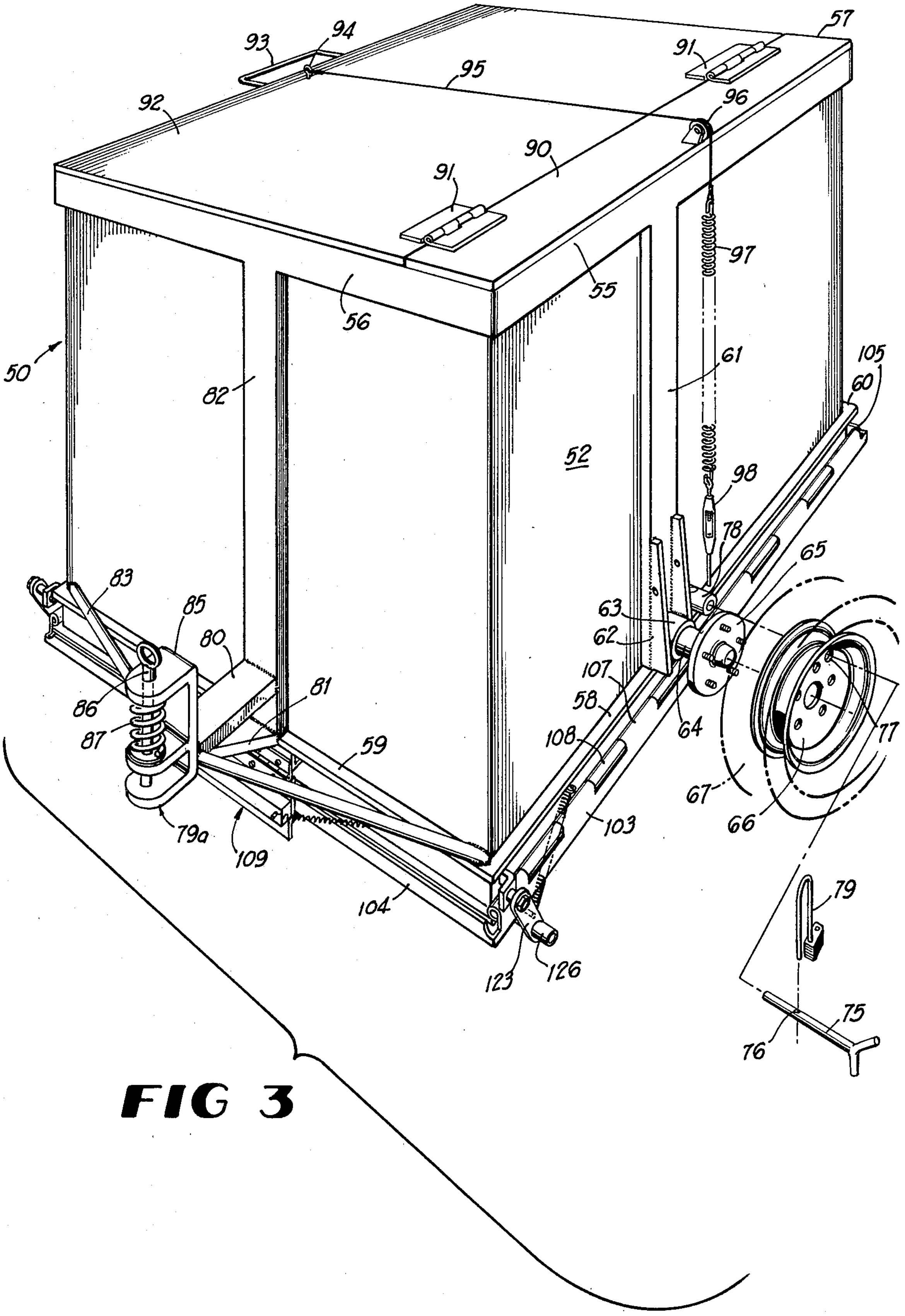
FIG. 3 is a perspective view of an individual refuse disposal receptacle of the system depicted in FIGS. 1 and 2.

In more detail, the receptacle 50, as best seen in FIG. 3, includes a container having a pair of opposed side panels 52, a front panel 53 and a back panel 54 formed into a rectangular tubular member having an open interior and a vertical axis. The body or container formed by the panels 52, 53 and 54 is reinforced by a frame which includes a top rectangular frame around the top edge, the top frame having longitudinally extending top struts 55 and transversely extending front struts 56 and transversely extending back strut 57. There is also a bottom rectangular frame for the body, this bottom rectangular frame including opposed pairs of bottom side struts 58, a front strut 59 and a rear strut 60, joined together at their end portions. The struts 58, 59 and 60 are each outwardly opening angle members.

Passing between the side struts 55 and 58 on each side are the vertical reinforcing bars 61, the lower end portions of which are provided with opposed pairs of vertical outwardly protruding brackets 62, each pair of which retains a journal 63 rotatably carrying a stub shaft 64, the end of which is provided with a hub 65 on which is mounted a rim 66 of a wheel having a pneumatic tire 67.

The axles 64 are in transverse alignment mounted slightly rearwardly of the center of gravity so that the weight of the receptacle 50 is forwardly of the transverse axis of axles 64. Thus, the receptacle 50 will normally rest on the tires 67 and front wheel 70 of a retractable front wheel assembly 71, seen in FIG. 1.

To prevent the theft or movement of the receptacle 50, a T-shaped, removable, locking rod 75 provided with a central radial hole 76 is inserted, as illustrated in FIG. 3, through a hole 77 in the rim 66 and, thence, into a sleeve 78 which is secured to one of the brackets 62 and to the strut 58. A pad lock 79 has a bale which passes through the hole 76 inwardly of the rim 66 so as to prevent the removal of the locking rod 75. Thus, there is a little chance of the receptacle 50 being towed away, unless authorized.

At the rear of the receptacle 50, adjacent the bottom portion thereof, is a trailer hitch assembly **79*a*, similar to the trailer hitch assembly 49*a* on the truck 49, this trailer hitch assembly 79*a* includes a rigid, rearwardly extending, mounting bracket bar 80 reinforced by reinforcing bar 81, the bars 80 and 81 projecting from a central vertical rear rib 82 which projects between the upper transverse strut 56 and the lower transverse strut 59. The mounting bar 80 is also reinforced by rearwardly converging side struts 83 which extend from the ends of the strut 59 to the ends of the bar 80**.

Secured to the end of the bar 80 is a U-shaped clevis 85, the spaced arms of which carry a vertically slidable locking pin 86 spring loaded by a coil spring 87 into a closed condition. When the pin 86 is lifted, the forwardly protruding rigid flat rectangular tongue 51 of a receptacle 50, arranged rearwardly of the particular receptacle 50 can be inserted in the clevis and the pin 86, thereafter, released to pass through an appropriate hole in the tongue 51 so as to couple the two receptacles 50 together as illustrated in FIG. 1. Through such an arrangement, a train of tandem arranged receptacles 50 can be attached to the trailer hitch 49*a* of the truck 49 so that they may be successively pulled over the roof area of the pit.

The upper end of each receptacle 50 is provided along one side with a fixed hinge carrying plate 90 secured to one of the struts 55 and the end portions of struts 56 and 57 as illustrated in FIG. 3. The inner edge portion of the plate 90 carries a pair of spaced opposed hinges 91 with a common longitudinal axis. Hinges 91 carry the edge portion of a hinged top or lid 92 having a handle 93 on its outer side. An eyelet 94 attached to the edge of the lid 92, adjacent handle 93, is provided with a cable 95 which extends transversely across the lid 92 and over a pulley 96 to a vertical tension spring 97. The pulley 96 is mounted on the edge of the plate 90 so that the cable 95 makes a 90° turn and passes downwardly, as illustrated in FIG. 3, outwardly adjacent strut 55. The spring 97 is, therefore, disposed outwardly adjacent one of the panels 52 and is connected by its bottom hook to a turn buckle 98 which, in turn, is connected to the strut 58, therebelow. Thus, when the lid 92 is lifted, the spring 97 and cable 95 will hold the lid 92 in its lifted condition. When, however, the lid 92 is closed, the cable 95 is approximately parallel to the upper surface of the lid 92 and, therefore, passes closely adjacent to the longitudinal axis of the hinges 91. Hence, it does not supply sufficient force to open the lid 92 until the lid 92 is lifted.

The open bottom end of each container 50 is closed by a pair of opposed inwardly folding hinged doors, denoted generally by the numerals 100. Each door 100 includes a flat rectangular panel 99 having upwardly turned liquid retaining flanges around its perimeter. These flanges include an inner upstanding flange member 101 reinforced by an angularly extending flange plate 102 and an outer upstanding flange member 103 disposed parallel to the flange member 101. The ends of the flange members 101 and 103 are joined by end flange members 104 and 105.

Figure 6:
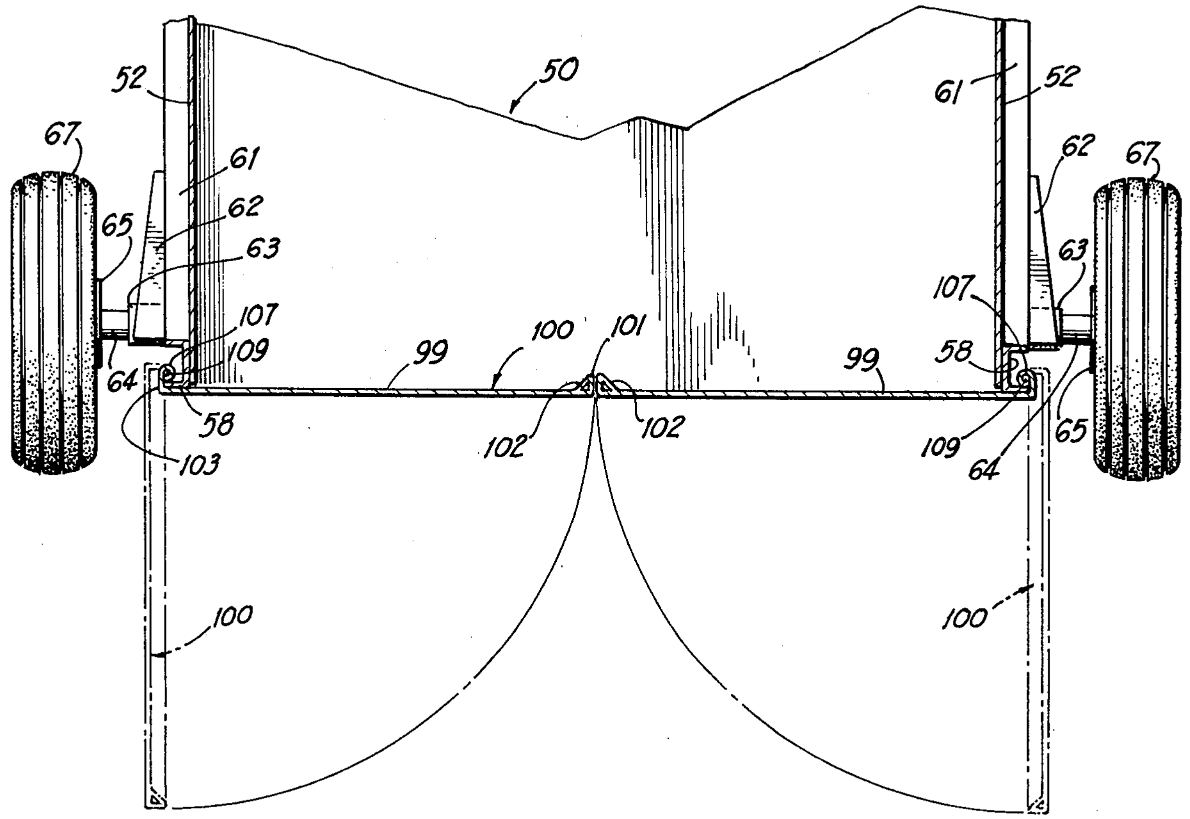
FIG. 6 is a vertical sectional view of the receptacle depicted in FIG. 3.

The upturned flange 103 of each door 100 is provided at its upper edge with hinge elements 107 which align with the hinge elements 108 to receive a hinge rod 109. The hinge elements 108 are connected to the lower flange of the channel member strut 58. The two hinge rods 109 are thus disposed in parallel longitudinal relationship on the outer side of the receptacle 50 and permit the doors 100 to swing inwardly and upwardly from a vertical, downwardly depending, open position, as shown by broken lines in FIG. 6, to a horizontally disposed closed position, as shown in full lines in FIG. 6, the panels 99 of the doors 100 being disposed in a common transverse plane, and the upstanding flanges 101 in abutting relationship and 103, 104 and 105 being disposed outwardly of the struts 58, 59 and 60, respectively. Thus, in such a horizontal position, the doors 100 can collect small quantities of liquid which are normally present in the refuse and will release this liquid when the doors 100 are open, the inclined flanges 102 directing the liquid downwardly and inwardly as the doors are opened.

Figure 4:
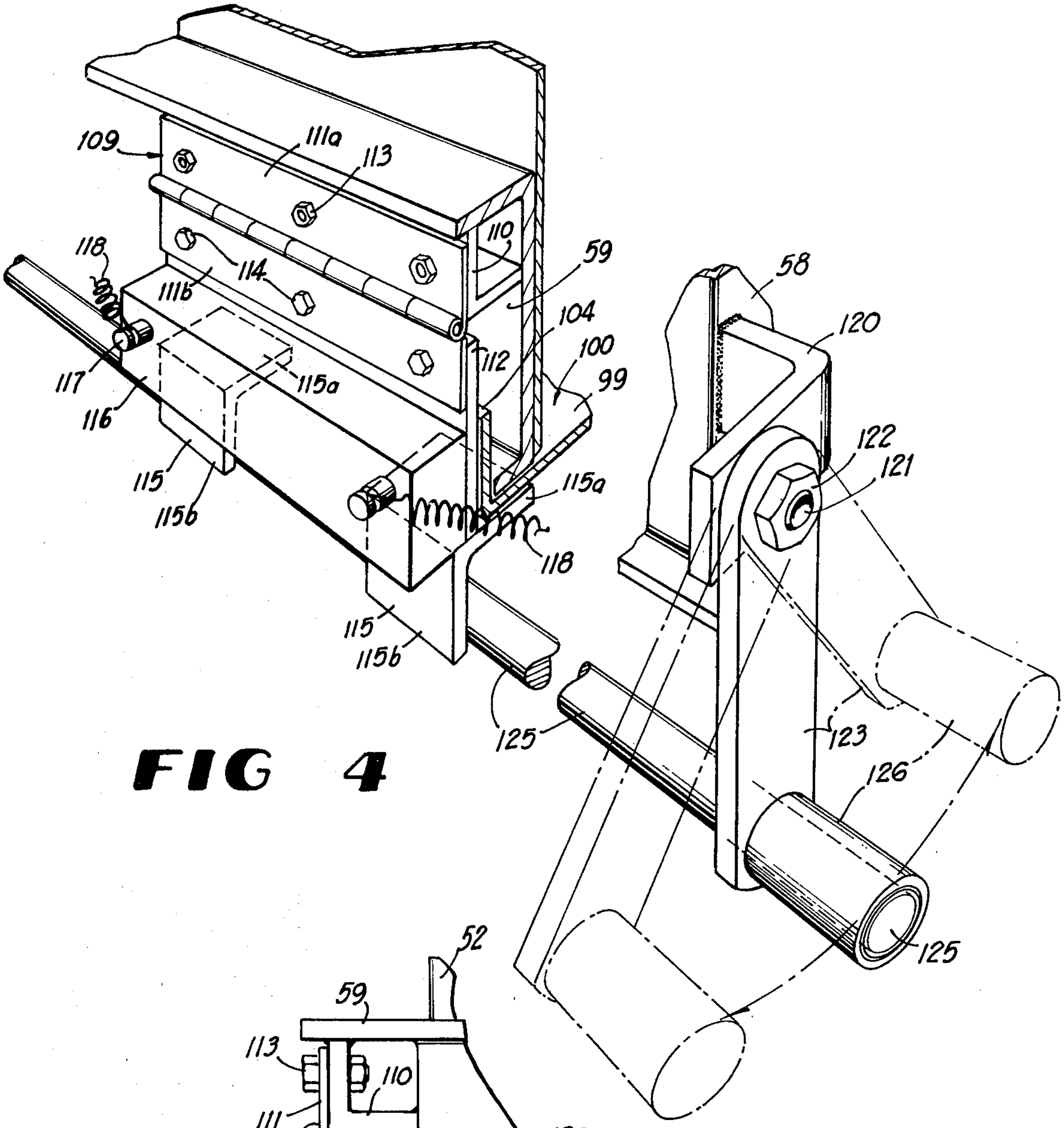
FIG. 4 is an enlarged perspective, fragmentary view of the detent assembly of the receptacle depicted in FIG. 3.
Figure 5:
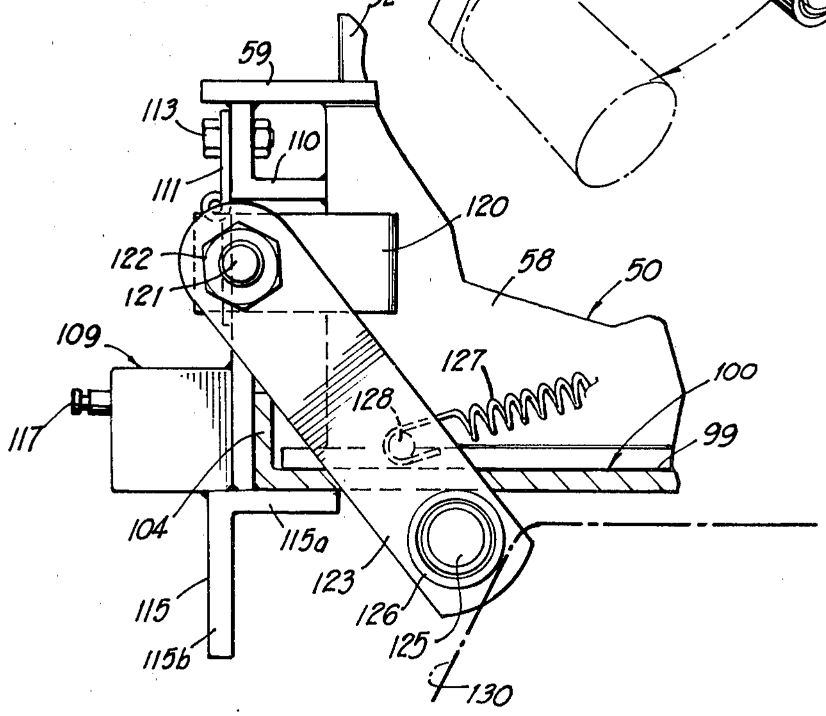
FIG. 5 is an end view of the structure depicted in FIG. 4.

For retaining the doors 100 in their inwardly folded closed positions, common front and rear detent members 109 and 139 removably support the inner corners of the front and rear corners of portions of the doors 100 when they are closed. The rear detent member 109, which is illustrated in FIGS. 4 and 5, includes a mounting bracket 110 fixed on the upper portion of the channel member strut 59. The bracket 110 is an angle iron which is welded in place in the central portion of the strut 59, below its upper flange, as depicted in FIG. 4. Bracket 110 thus provides a vertically disposed outer mounting surface which receives the upper leaf 111*a* of a transverse hinge 111, the other or lower leaf 111*b* of which carries a rectangular swing plate 112 which pivotally hangs downwardly, therefrom. Belts 113 secure the upper leaf 111*a* to the bracket 110 and bolts 114 secure the lower leaf 111*b* to the plate 112.

The lower end portion of the plate 112 carries a pair of transversely spaced L-shaped latch members 115, one flange 115*a* of which protrudes in a horizontal position inwardly and beneath the flange 104 and beneath a portion of the panel 99 adjacent to the rear inner corner of one door 100 to provide removable support therefor. In like fashion, the flange 115*a* protrudes beneath the rear inner corner portion of the other door. Each member 115 also has a downwardly extending flange 115*b* which functions as a camming member, for purposes to be described hereinafter.

The plate 112 is weighted by a weight 116 protruding outwardly from the rear surface of the plate 112. Pins 117 are secured to this weight at its end portions and respectively receive the ends of tension springs 118 which are secured to the strut 59.

At the rear outer corners of the receptacle 50, the struts 58 are provided with lever supporting brackets 120 which carry transversely aligned outwardly protruding pivot pins such as pen 121 provided with external threads which receive a nut 122. The pivot pins 121 respectively carry downwardly extending lever arms 123 which will protrude below the doors 100 and support between their lower end portions a transversely extending, door tripping bar 125. The ends of door tripping bar 125 protrudes through the levers 123 and outwardly thereof so that these outer portions rotatably receive cam follower sleeves 126.

The cam follower sleeves 126 protrude in the opposite directions transversely outwardly so that they may be engaged by the inclined surfaces of the opposed stationary camming plates 160 so as to urge the levers 123 rearwardly as the receptacle is pulled over the mouth of chute 31. The levers 123, however, are normally spring loaded to downwardly and forwardly inclined positions, shown in FIG. 5, by means of tension springs such as spring 127, seen in FIG. 5, spring 127 being connected between the strut 58 and a pin 128 on the lever 123.

Upon urging the levers 123 rearwardly, the cross bar 125 engages the downwardly protruding flanges 115*b*, as shown in FIG. 4, so as to pivot the plate 112 rearwardly and upwardly about the transverse axis of the hinge 111 and, thus, withdraw the two flanges 115*a* from beneath the corner portions of the closed doors 100, thereby releasing the doors 100 to swing downwardly.

Figure 7:
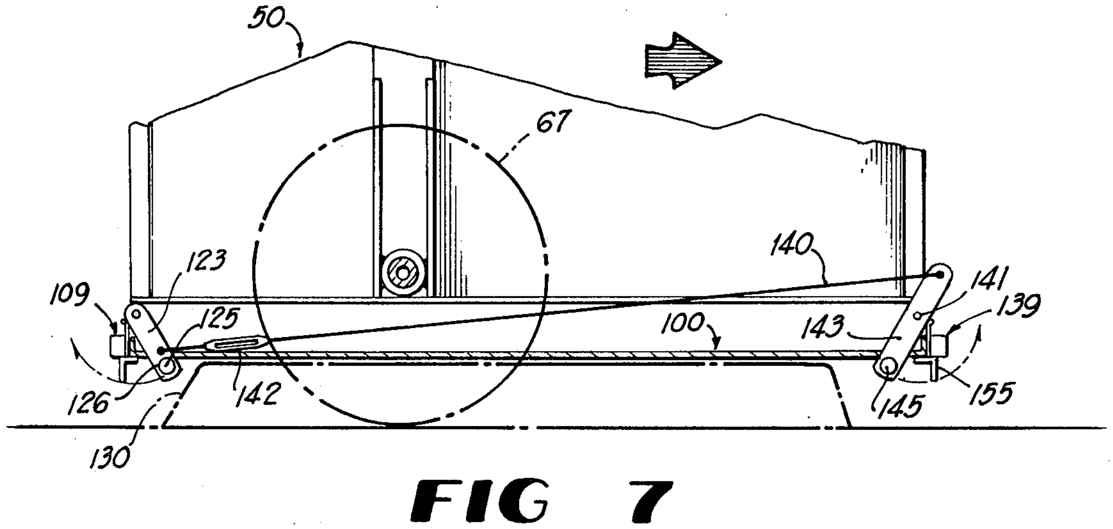
FIG. 7 is a side elevational view of the receptacle depicted in FIG. 3.

As shown in FIG. 7, it may be found desirable but not necessary to provide a front detent member 139 which is essentially identical to the rear detent member 109, but swings forwardly being tripped by a cross bar 145 carried by levers 143. The levers 143 are urged rearwardly by a spring mechanism, (not shown), which is substantially identical to the spring mechanism shown for the rear levers 123. The levers 143 protrude above their pivot pins 141 and each front lever is provided, at its upper end portion, with a cable 140 which connects through a turnbuckle 142 to the lower portion of its associated lever 123. Thus, as the levers, such as lever 123, are urged rearwardly through action of the camming plates 126, the lever, such as lever 143, will be urged in a counterclockwise direction so as to carry the cross bar 145 forwardly, all as indicated by the arcuate arrows in FIG. 7. The cross bar 145 thus strikes the downwardly extending flanges 155 so as to urge them forwardly. Hence, all four adjacent corners of the two closed doors 100 will simultaneously be released so that the doors 100 swing downwardly.

The tripping of the detents 109 and 139 is solely the function of the camming sleeves 126 engaging the camming surfaces of the cam plates 160.

These cam plates 160 are upstanding metal plates which have upwardly inclined ends and straight horizontal central upper edges. Cam plates 160 are arranged in opposed parallel relationship, outwardly adjacent the path of travel of the receptacle 50 across the pit. Hence, the inclined front end will provide camming services to open doors 100 and the straight edges will hold the camming sleeves 126 in their rearward positions throughout the length of travel of the receptacle 50 across the pit and until the doors 100 are again in their closed positions. At that time, the camming sleeves 126 will clear the cam plates 160 so as to release the camming sleeves 126 and detent members 109 and 139 so that the flanges 115*a* and 155*a* will swing again beneath the doors 100.

Referring back to FIG. 2, it will be seen that there are upstanding guide plates 130 which are spaced inwardly of and parallel to the camming plates 160 on the inner sides of the tire receiving plates 18 and 22, these camming plates 160 being fixed to the struts 16 which define the central mount or opening 161 for the pit or chute 31. This central opening 161, when not in use, is closed by a hinge door 162 which is hingedly secured by means of a hinge 163 to one of the struts 16, the lower central portion of the door 162 forming with chute 31 a drop way from the refuse. A pair of brackets 164 carry A pivot pin 165 which passes through one end of a piston rod 166 which protrudes from one end of a hydraulic cylinder 167. The other end of hydraulic cylinder 167 is pivotally connected to brackets 168 mounted in the central portion of the back wall 15. Thus, when the hydraulic cylinder 167 extends the piston rod 166, the door 162 will be pivoted from its open vertical position shown in FIG. 2, to a closed horizontal position parallel to and between plates 18 and 22 for closing the mouth of the chute or hopper 31.

At the forward end of the door 162 is a perpendicular downwardly protruding flange 168 which, when the door 162 is closed, closes the forward portion of the opening 161. Thus, in the closed position of door 162, the flange 168 is disposed with its lower portion adjacent to the lower common edge 170 of an upwardly and forwardly inclined slide plate 171 and the forward wall of chute 31, the upper end of plate being connected to the cross strut 21 at the forward end of the pit. Side plates 172 are on opposite sides of the slide plate 171 define therewith the downwardly inclined chute which feeds to the mouth of the vertical chute 31.

Above the incline plate 171 are a pair of forwardly converging, upwardly and forwardly inclined, opposed, door closing bars 175 which are cylindrical rods which project from the inner ends of the plates 172 forwardly, upwardly and inwardly to terminate respectively at a pair of brackets 176. The brackets 176 also carry a transverse axle 177 which support a freely rotatable pneumatic wheel or tire 178, the upper periphery of which extends slightly above the plane of the bars 175. Furthermore, the bars 175 are bent inwardly toward each other so as to be disposed closely adjacent each other, immediately rearwardly of the periphery of the wheel 178. Thus, as the receptacle 50, with its doors 100 extending downwardly in their open positions, moves forwardly, lower inner portions of the bars 175 are engaged by the front edges of the doors 100 and progressively urge these doors 100 inwardly, as the receptacle 50 travels forwardly. The inner edge portions of doors 100 then ride over wheel 178 and are yieldably urged upwardly. Thus, the doors 100 of each receptacle 50 are automatically closed when the camming sleeves 126 clear the camming plates 160.

In operation, the pit door 162 is normally in a closed position but is opened prior to the time the pit is to receive refuse. Thereafter, the operator drives the truck 49 across the pit so that the wheels of the truck ride on the tracks or plates 18 and 22 and each passes between its opposed camming member 160 and guide plate 130. When each receptacle 50 is in appropriate position to drop its contents, the camming members 160 urge the cam followers 126 rearwardly, thereby releasing the detents members 109 and 139 to release the doors 100, which swing from their horizontal positions downwardly to their vertical position. This drops refuse downwardly through vertical chute 31 and into the chamber 32 of the compactor, the refuse piling up on the floor 36. Thereafter, the compactor 30 is energized either electrically by closing of a switch (not shown) manually or automatically as desired, to actuate ram plate 35 to feed the refuse sidewise through the throat or mouth 32 and into the container 40. The progressive forward movement of the receptacle 50, after the doors 100 are opened, will automatically cause the doors 100 to be closed by the rods 175 and the wheel 178. The next receptacle 50 is then in position and automatically dumps, as described above. Thus, each receptacle 50 is progressively positioned over the chute 31 and releases its contents.

The present construction provides an easy and inexpensive system for collecting refuse in strategic locations in the individual receptacles 50 which can then be picked up and formed into a train and successively dumped in the pit where a single compactor 30 compacts the refuse into the container 40. Each container 50 can be readily attached or detached from the truck 49 or from another similar receptacle 50. The front wheel 70 is retracted during transportation and dumping but can be extended to support the receptacle 50 in a level condition at its site. The lock 79 prevents the receptacle from being moved by arresting pin 75 in the hole 77.

It will be obvious to those skilled in the art that many variations may be made in the embodiment here chosen for the purpose of illustrating the present invention without departing from the scope thereof, as defined by the appended claims.

What is claimed is:

1. A garbage disposal system comprising:

(a) a plurality of garbage receptacles each including (i) a body having side walls with a top opening through which the receptacle is filled and a bottom opening through which the contents are released, (ii) wheel means for each of said receptacles; (iii) opposed door means hingedly secured to said side walls on said body for temporarily closing said bottom opening; and (iiii) detent means for latching said door means in closed positions; and (iiiii) means for coupling said receptacles together in tendem for movement as a train;

(b) means defining a pit with an open top and an open side;

(c) a compactor within said pit;

(d) means defining a chute within said pit for said compactor;

(e) a roof for said open top across which said receptacles can be successively moved when they are arranged in tandem, said roof having an opening therein;

(f) tripping means for tripping the detent means of each of said receptacles as each receptacle is positioned over the opening of said top for permitting said door means of such receptacle to open for releasing the contents of said receptacle into said chute and then into said compactor;

(g) container means removably positioned adjacent to the discharge opening of said compactor for receiving the contents of said compactor therethrough;

(h) means for actuating said compactor to urge such contents into said container and for compacting such contents; and (i) means for closing said opening when said pit is not in use.

2. The refuse disposal system defined in claim 1 wherein said door means includes a flat panel and upstanding flanges surrounding said panel, said panel being hinged to one of said side walls and being disposed in a horizontal position when closed so as to receive and retain liquid in the bottom portion of said receptacle.

3. The refuse disposal system defined in claim 1 wherein said door means includes a pair of opposed doors respectively hingedly secured to opposite side walls of said body, said doors being foldable from open vertical positions to substantially horizontal closed positions with their edges abutting each other.

4. The structure defined in claim 3 wherein said detent means are disposed at the ends of said body for simultaneously supporting the corner portions of said opposed doors, said detent means being movable to release said doors.

5. The refuse disposal system defined in claim 4 wherein said roof is provided with an upstanding camming plate for actuating said detent means when a receptacle is moved over said pit.

6. The refuse disposal system defined in claim 1 wherein each of said receptacles is provided with coupling means for coupling one receptacle to the next, said coupling means including a clevis at one end of said receptacle and a tongue at the other end of said receptacle, said clevis receiving and locking the tongue of the next adjacent receptacle in place when said receptacles are arranged in tandem.

7. The refuse disposal system defined in claim 6 including a prime mover for moving said receptacles when said receptacles are arranged in tandem.

8. The refuse disposal system defined in claim 1 wherein said compactor includes a ram plate movable across said compactor and wherein said container is disposed adjacent to and aligned with the discharge opening of said compactor and into which the contents of said compactor are laterally moved by said ram plate.

9. The refuse disposal system defined in claim 1 including door closing means having a pair of opposed, inclined, upwardly converging door closing bars mounted in said means for defining said pit adjacent to said open top and in a position to engage and close said door means on each of said receptacles, successively, after said doors means have been opened for discharging the contents of its receptacle, said detent means being capable of again latching said door means in a closed condition after said door means has been closed by said door closing means.

10. The refuse disposal system defined in claim 9 including an upwardly and forwardly inclined slide plate disposed below said door closing bars for directing the contents of the receptacle into said compactor.

11. The refuse disposal system defined in claim 9 wherein said door means includes a pair of opposed doors and hinge means hingedly securing said doors respectively to the opposed side walls of said body, said doors being pivotable from an open vertical position to a closed position in which said door means are disposed in a common horizontal plane, said detent means engaging said door for supporting said door in its closed condition and wherein said doors are respectively engaged by said door closing bars after being opened to dump the contents of the receptacle for simultaneously closing said doors.

12. The refuse disposal system defined in claim 11 wherein said doors each include a flat panel and flanges surrounding the perimeter of said panel, said flanges extending upwardly for confining liquid on said panels.

13. The refuse disposal system defined in claim 1 including a pin for removably being received through said wheel means and into a portion of said body and lock means for locking said pin in place.

14. The refuse disposal system defined in claim 1 including a lid for closing said top opening of said body, said lid being hingedly secured adjacent to one of the side walls of said body and spring means for holding said lid in an opened position until said lid is closed.

15. The refuse disposal system defined in claim 14 wherein said spring means includes a cable secured to the outer portion of said lid, said cable extending adjacent to said lid when said lid is closed and pulley means over which said cable passes, said pulley means being disposed adjacent to an upper edge of the wall of said body and a spring disposed adjacent to said wall and extending in a substantially vertical position, the lower end portion of said spring being secured to said body.

16. The refuse disposal system defined in claim 1 wherein said wheel means includes a pair of side wheels disposed on opposite sides of said body and a front wheel, said side wheels being provided with a common transverse axis rearwardly of the center of gravity and said front wheel being disposed forwardly of the center of gravity of said receptacle, said front wheel being retractable out of engagement with the ground when the receptacle is arranged in tandem with other similar receptacles.

17. A garbage disposal system comprising:

(a) a plurality of garbage receptacles each including (i) a body having side walls with a top opening through which the receptacle is filled and a bottom opening through which the contents are released, (ii) wheel means for each of said receptacles; (iii) opposed door means hingedly secured to said side walls on said body for temporarily said bottom opening; and (iiii) detent means for attaching door means in closed positions; and (iiiii) means for coupling said receptacles together in tendem for movement as a train;

(b) means defining a pit with an open top and an open side;

(c) a compactor within said pit;

(c) means defining a chute within said pit for said compactor;

(e) a roof for said open top across which said receptacles can be successively moved when they are arranged in tandem, said roof having an opening therein;

(f) tripping means for tripping the detent means of each of said receptacles as each receptacle is positioned over the opening of said top for permitting said door means of said receptacle to open for releasing the contents of said receptacle into said chute and then into said compactor; extending positions to inwardly extending closed positions closing said bottom opening;

(d) detent means for engaging the inner corners of said doors when they are closed;

(e) means for tripping said detent means.

* * * * *